(12) United States Patent
Suzuki

(10) Patent No.: US 10,012,192 B2
(45) Date of Patent: Jul. 3, 2018

(54) END SEAL STRUCTURE OF A FUEL RAIL FOR A GASOLINE DIRECT INJECTION ENGINE

(71) Applicant: USUI KOKUSAI SANGYO KAISHA LIMITED, Shimizu-cho, Sunto-gun, Shizuoka (JP)

(72) Inventor: Shuji Suzuki, Shimizu-cho (JP)

(73) Assignee: Usui Kokusai Sangyo Kaisha Limited (JP)

(*) Notice: Subject to any disclaimer, the term of this patent is extended or adjusted under 35 U.S.C. 154(b) by 0 days.

(21) Appl. No.: 15/318,380

(22) PCT Filed: Jul. 15, 2015

(86) PCT No.: PCT/JP2015/070293
§ 371 (c)(1),
(2) Date: Dec. 13, 2016

(87) PCT Pub. No.: WO2016/010078
PCT Pub. Date: Jan. 21, 2016

(65) Prior Publication Data
US 2017/0122277 A1    May 4, 2017

(30) Foreign Application Priority Data
Jul. 16, 2014  (JP) .................. 2014-145609

(51) Int. Cl.
*F16L 55/10* (2006.01)
*B65D 59/06* (2006.01)
(Continued)

(52) U.S. Cl.
CPC ........ *F02M 55/004* (2013.01); *F02M 55/025* (2013.01); *F02B 17/005* (2013.01); *F16L 57/00* (2013.01)

(58) Field of Classification Search
CPC .. F16L 55/1152; F16L 37/26; Y10T 29/49718
(Continued)

(56) References Cited

U.S. PATENT DOCUMENTS 6,135,156 A * 10/2000 Donoho .............. F16L 55/1152
                                                              138/109
7,404,419 B2 * 7/2008 Pajaro Gonzalez .. F16L 57/005
                                                              138/89
(Continued)

FOREIGN PATENT DOCUMENTS

JP    2-199269      8/1990
JP    2005-120982   5/2005
(Continued)

OTHER PUBLICATIONS

International Search Report dated Oct. 13, 2015.

*Primary Examiner* — Patrick F Brinson
(74) *Attorney, Agent, or Firm* — Gerald E. Hespos; Michael J. Porco; Matthew T. Hespos

(57) ABSTRACT

Provided is an end seal structure of a fuel rail for a gasoline direct injection engine, the end seal structure being characterized in that: a collar is joined by brazing to an outer circumference of an end of a pipe of the rail body including a pipe; the end cap having a cap-nut shape and including a sealing projection on a surface thereof facing the opening at the end of the pipe of the rail body, is screwed and fixed to the collar; and the sealing projection of the end cap brings into pressure contact with the end of the opening of the rail body by an axial force created by tightening of the end cap having the cap-nut shape to seal the end of the opening of the rail body.

7 Claims, 4 Drawing Sheets

(51) Int. Cl.
  *F02M 55/00* (2006.01)
  *F02M 55/02* (2006.01)
  *F02B 17/00* (2006.01)
  *F16L 57/00* (2006.01)

(58) Field of Classification Search
  USPC .............. 138/109, 96 T, 96 R; 285/387, 388
  See application file for complete search history.

(56) References Cited

U.S. PATENT DOCUMENTS

| | | | |
|---|---|---|---|
| 7,597,117 B1 * | 10/2009 | Groso | ................ F16L 55/1108 138/89 |
| 8,001,995 B2 * | 8/2011 | Molloy | .............. F01M 11/0408 138/89 |
| 2011/0108005 A1 | 5/2011 | Nishizawa et al. | |

FOREIGN PATENT DOCUMENTS

| | | |
|---|---|---|
| JP | 2010-7651 | 1/2010 |
| JP | 2011-144768 | 7/2011 |
| JP | 2012-136961 | 7/2012 |

* cited by examiner

END SEAL STRUCTURE OF A FUEL RAIL FOR A GASOLINE DIRECT INJECTION ENGINE

BACKGROUND

1. Field of the Invention

The present invention relates to an end seal structure of a fuel rail (delivery pipe) for supplying high-pressure fuel, which is supplied from fuel booster pumps of electronic fuel injection-type automobile engines or the like, through a fuel injector (an injection nozzle) directly injecting the fuel into an engine cylinder. More specifically, the present invention relates to an end seal structure of a fuel rail for a gasoline direct injection engine configured to directly supply the fuel from the rail to the injector with an injection pressure in the order of 20 MPa to 70 MPa.

2. Description of the Related Art

Some exemplary fuel rails can be mentioned as the conventional fuel rails for gasoline direct injection engines of this type. For example, an exemplary fuel rail includes a main pipe and several branch pipes and is constructed and arranged such that through-holes for receiving each branch pipe are formed in an outer wall of the main pipe, each through-hole having an annular wall that projects toward the outside and inside of the main pipe, respectively, and each branch pipe being fixed to the annular wall. Another exemplary fuel rail is constructed and arranged such that a branch pipe is connected to a body, which is an accumulating vessel, directly or via a branch joint fitting (nipple). Still another exemplary fuel rail is constructed and arranged such that a socket for connection of an injector is directly attached to a rail body constituted by a tubular member such as a pipe. Further, other exemplary fuel rails may be mentioned as the fuel rail constructed and arranged such that the socket for connection of the injector is directly attached to the rail body constituted by the tubular body such as the pipe. For example, an exemplary fuel rail includes an injector holder and a fastening bracket that are directly attached to a rail body constituted by a tubular body such as a pipe to which high-pressure fuel is supplied from a high-pressure fuel pump (see Japanese Patent Laid-Open No. 2010-7651). Also, a high-pressure fuel delivery pipe for a direct injection engine includes a cylindrical body pipe into which pressurized fuel from a high-pressure fuel pump is supplied, a plurality of sockets to which fuel injection valves coupled to the body pipe and operable to be opened and closed by a control unit are coupled, and a plurality of mounting stays integrally fastened to the body pipe so as to attach the body pipe to the engine (see Japanese Patent Laid-Open No. 2011-144768).

However, the above-mentioned conventional fuel rails for gasoline direct injection engines have the following problems.

Specifically, in the above-mentioned various conventional fuel rails for gasoline direct injection engines, a rail body constituted by a tubular body such as a pipe is constructed and arranged such that an end or both ends thereof are closed, and its end rail structure is, for example as illustrated in FIGS. 6 and 7 by enlarged views, generally configured such that end caps 112A and 112B are each joined by brazing to corresponding one of the ends of the openings of a cylindrical body pipe 111. Meanwhile, a problem that is identified and should be addressed is the strength of the end caps 112A and 112B closing the both ends of the body pipe 111 in the trends of higher pressures in gasoline direct injection systems. More specifically, the following and other problems are identified. In the case of the end seal structure configured by joining the end caps 112A and 112B by brazing to the body pipe 111 as illustrated in FIGS. 6 and 7, the end seal structure is configured such that, when an internal pressure is applied in the body pipe 111 which is the rail body, a force created in a radial direction of the rail body at the time of the body pipe 111 being deformed in the radial direction (swollen outward of the pipe) is received by the brazed portions 113A and 113B, respectively, so that these brazed portions 113A and 113B become the weakest portions in terms of their strength, which makes it difficult for gasoline direct injection systems to meet their higher-pressure requirements. Further, since the brazed portions 113A and 113B are in direct contact with the fuel (pressure medium), if there is any unevenness in the shape of these brazed portions, then it tends to become a factor of breakage of the brazed portions due to concentration of stress. Also, the body pipe 111 needs to be made thicker if threading is performed on the body pipe 111 to directly fix the end caps 112A and 112B to the body pipe 111.

It is accordingly an aim of the present invention, which has been made in view of the problems found in the conventional fuel rails, to provide an end seal structure of a fuel rail for a gasoline direct injection engine, in particular in a rail body constituted by a tubular body such as a pipe constructed and arranged such that one end or both ends thereof are closed by an end cap or caps, having a simple structure and allowing the end cap portion to meet higher pressure requirements without the need of providing a thicker rail body.

SUMMARY

An end seal structure of a fuel rail for a gasoline direct injection engine in accordance with the present invention is constructed and arranged such that a brazed portion does not receive a force created in a radial direction of the rail body under the application of an internal pressure to the rail body, and the brazed portion does not contact a fuel (pressure medium). The features of this end seal structure is characterized in that: in a fuel rail in which an end or both ends of a rail body thereof composed of a pipe is/are closed by an end cap or end caps, a collar is joined by brazing to an outer circumference of an end of the pipe of the rail body, the collar having a short cylindrical body and including an external thread formed on an outer circumferential surface of the collar; the end cap having a shape of a cap nut is screwed and fixed to the collar, the end cap having a sealing projection on an surface thereof facing the opening at the end of the pipe of the rail body, the sealing projection being placed in abutting contact with an end face of the opening at the end of the pipe; and the sealing projection of the end cap brings into pressure contact with an end of the opening of the rail body by an axial force created by tightening of the end cap having the cap-nut shape so as to seal the end of the opening of the rail body.

Also, a preferable aspect of the present invention lies in that the sealing mechanism to seal the rail body by the end cap having the cap-nut shape is configured such that: the sealing projection of the end cap having the cap-nut shape has a cross-sectionally trapezoidal shape and an area where the sealing projection comes into contact with an end edge on an inner surface of the opening at the end of the pipe of the rail body defines a tapered surface; and the tapered surface of the sealing projection brings into pressure contact with the end edge on the inner surface of the rail body so as to seal the end of the opening of the rail body.

In addition, another preferable aspect of the present invention lies in that another sealing mechanism to seal the rail body by the end cap having the cap-nut shape is configured such that an inner surface of the opening at the end of the pipe of the rail body defines a tapered surface whose diameter increases outward, and a front edge of the sealing projection of the end cap having the cap-nut shape brings into pressure contact with the tapered surface so as to seal the end of the opening of the rail body.

Further, still another preferable aspect thereof lies in that: a still another sealing mechanism to seal the rail body by the end cap having the cap-nut shape includes an annular projection that is formed on an edge face of the opening at the end of the pipe of the rail body, the annular projection is brought into pressure contact with an end face of the sealing projection of the end cap having the cap-nut shape so as to seal the end of the opening of the rail body; or includes an annular projection that is formed on the sealing projection of the end cap having the cap-nut shape, the annular projection brings into pressure contact with the edge face of the opening at the end of the pipe of the rail body so as to seal the end of the opening of the rail body.

The present invention is also characterized in that: in a fuel rail in which an end or both ends of a rail body including a pipe is/are closed by an end cap or end caps, a collar is joined by brazing to an outer circumference of the end of the pipe of the rail body, the collar having a short cylindrical body and including an internal thread formed on an inner circumferential surface of an outer end thereof; the end cap having a bolt shape is screwed and fixed to the collar, the end cap having a sealing projection on an surface thereof facing the opening at the end of the pipe of the rail body, the sealing projection being placed in abutting contact with an end of the opening at the end of the pipe; and the sealing projection of the end cap brings into pressure contact with the end of the opening of the rail body by an axial force created by tightening of the end cap having the bolt shape so as to seal the end of the opening of the rail body.

A preferable aspect lies in that the sealing mechanism to seal the rail body by the end cap having the bolt shape is configured such that an inner surface of the opening at the end of the pipe of the rail body defines a tapered surface whose diameter increases outward, and a tip portion of the sealing projection of the end cap having the bolt shape brings into pressure contact with the tapered surface so as to seal the end of the opening of the rail body.

The end seal structure of the fuel rail for the gasoline direct injection engine in accordance with the present invention is constituted by the collar joined by brazing to the outer circumference of the end of the pipe of the rail body and the end cap having the shape of the cap nut screwed and fixed to the collar, and configured such that the end cap having the shape of the cap nut is placed in pressure contact with the end of the opening at the end of the pipe of the rail body by the axial force created by tightening of the end cap having the cap nut shape and thereby the end of the opening of the rail body is sealed. With the configuration, the end seal structure of the invention has the following advantageous effects: since the force created at the time of the rail body being deformed in the radial direction (swollen outward of the pipe) under application of an internal pressure to the rail body is not received by the brazed portion and thus the brazed portion acts as a compressive stress against the deformation of the rail body at the time of application of the internal pressure, the end seal structure becomes advantageous in terms of resistance to fatigue failure and allows to sufficiently meet the higher pressure requirements of a system; since the brazed portion has no contact with the fuel (pressure medium), even when any unevenness exists in the shape of the brazed portion, it does not act as a cause of breakage due to the concentration of stress, and the stability and reliability of the seal at the end of the rail body are ensured; since the thickness of the rail body can be kept in its minimum level, the rail body does not need to have a thicker body; and when other components (such as injector socket, bracket) are brazed to the rail body, substitution of the atmosphere gas in the rail body proceeds smoothly in a furnace, which makes it possible to achieve good brazing quality.

DETAILED DESCRIPTION

A main pipe rail in accordance with the present invention is a main body of a fuel rail for gasoline direct injection engines, in which a fuel inlet pipe (not shown) is connected to one end or a wall surface of the main pipe rail, the fuel inlet pipe is connected by a piping (not shown) to a fuel tank (not shown), fuel of the fuel tank is transferred to the fuel inlet pipe through the piping and a fuel pump, made to flow from the fuel inlet pipe to the main pipe rail, and then injected from an injector (not shown) into a cylinder (not shown). The main pipe rail 1 includes a plurality of sockets (not shown) or the like in its circumferential wall portion, the socket being adapted to allow the injector to be connected thereto. By way of example, a four-cylinder engine and an in-line six-cylinder engine will be equipped with four sockets and six sockets, respectively, which are provided at desired intervals.

Figure 1:
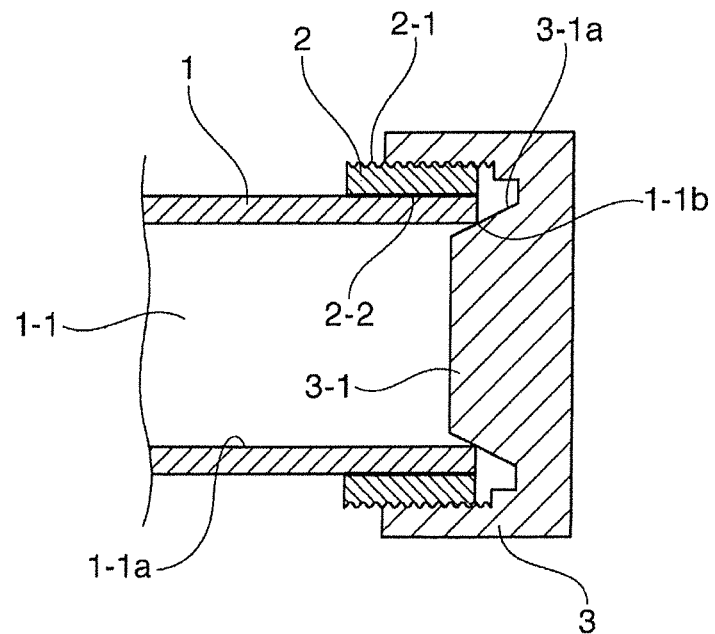
FIG. 1 is a cross-sectional view illustrating an end seal structure of a fuel rail for a gasoline direct injection engine in accordance with a first embodiment of the present invention.

In FIG. 1, a reference sign 1 denotes a rail body, a reference sign 2 denotes a collar, and a reference sign 3 denotes an end cap having the cap-nut shape. More specifically, in an end seal structure of a fuel rail for a gasoline direct injection engine in accordance with a first embodiment shown in FIG. 1, the collar 2, which has a short cylindrical body and including an external thread 2-1 on the outer circumferential surface thereof, is joined by brazing to an outer circumference of an end of the pipe of the rail body 1 having a cylindrical inner circumferential wall surface 1-1a defining a flow passage 1-1 therein. A reference sign 2-2 denotes a brazed portion. The end cap 3 having the cap-nut shape includes a sealing projection 3-1 on an opposed surface facing an opening at an end of the pipe of the rail body 1, the sealing projection 3-1 being adapted to be brought into abutting contact with an end face of the opening at the end of the pipe. The sealing projection 3-1 is screwed and fixed to the collar 2 and the sealing projection 3-1 of the end cap brings into pressure contact with the end of the opening of the rail body by the axial force created by tightening of the end cap 3 having the cap-nut shape and thereby the end of the rail body is sealed. As a sealing mechanism thereof, the first embodiment employs the configuration in which the sealing projection 3-1 of the end cap 3 having the cap-nut shape has a cross-sectionally trapezoidal shape, and an area where the sealing projection comes into contact with an end edge 1-1b on the inner surface of the opening at the end of the pipe of the rail body 1 defines a tapered surface 3-1a, and the tapered surface 3-1a of the sealing projection 3-1 is brought into pressure contact with the end edge 1-1b on the inner surface of the rail body 1 and thereby the end of the rail body 1 is sealed.

According to the end seal structure of the fuel rail for the gasoline direct injection engine shown in FIG. 1, when the end cap 3 having the cap-nut shape screwed and fixed to the collar 2 is tightened, the tapered surface 3-1a of the sealing projection 3-1 of the end cap is brought into pressure contact with the end edge 1-1b on the inner surface side of the opening at the end of the pipe of the rail body 1 by an axial force created by the tightening of the end cap 3 having the cap-nut shape and thus the end of the opening of the rail body 1 is sealed. Accordingly, in the case of this end seal structure of a fuel rail for a gasoline direct injection engine, the brazed portion 2-2 acts as a compressive stress against deformation in the radial direction of the rail body 1 (swelling toward the outside of the pipe) which is created as an internal pressure acts upon the flow passage 1-1 of the rail body 1. As a result, the brazed portion 2-2 exhibits excellent characteristics in terms of resistance to fatigue failure and has the capability of accommodating itself to a higher internal pressure applied to the flow passage 1-1 of the rail body 1. Also, the brazed portion 2-2 is constructed and arranged such that it does not contact the fuel (pressure medium) in the rail body 1. Accordingly, even if the shape of the brazed portion has any unevenness, it never acts as a factor that leads to breakage due to concentration of stress. Moreover, the stability and reliability of the seal at the end of the rail body 1 are ensured thanks to the sealing mechanism that the tapered surface 3-1a of the sealing projection 3-1 of the end cap is brought into pressure contact with the end edge 1-1b on the inner surface side of the opening at the end of the pipe of the rail body 1 by the axial force created by tightening of the end cap 3 having the cap-nut shape and thus the end of the rail body is sealed. Further, this end seal structure is configured such that the end cap 3 having the cap-nut shape is screwed to the collar 2, which means that the end cap 3 having the cap-nut shape is not directly screwed to the rail body 1, so that the rail body 1 does not need to be made thicker.

Figure 2:
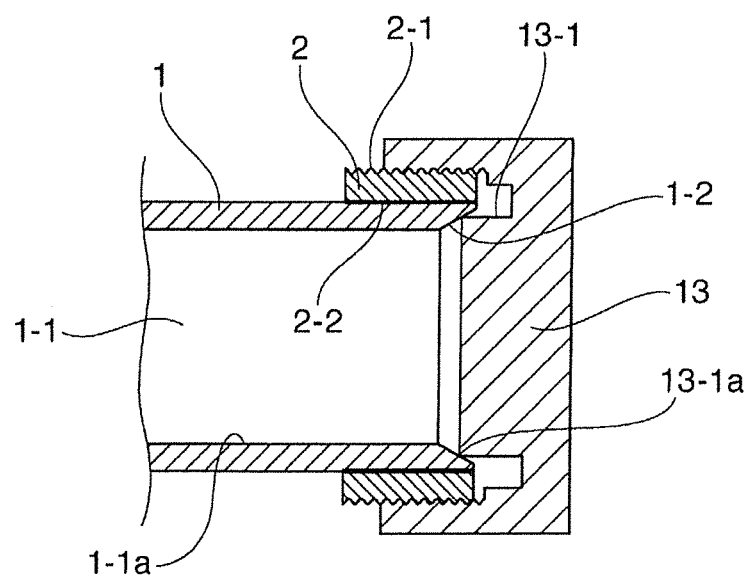
FIG. 2 is a cross-sectional view illustrating an end seal structure in accordance with a second embodiment of the present invention.

An end seal structure of a fuel rail for a gasoline direct injection engine in accordance with a second embodiment shown in FIG. 2 employs a sealing mechanism in which an inner surface of an opening at an end of a pipe of a rail body defines a tapered surface with its diameter gradually increased outward, and a front edge of a sealing projection of an end cap having a cap-nut shape brings into pressure contact with the tapered surface and thereby the end of the rail body is sealed. More specifically, as shown in FIG. 2, the tapered surface 1-2 whose diameter gradually increases outward is formed on the inner surface of the opening at the end of the pipe of the rail body 1 having the cylindrical inner circumferential wall surface 1-1a defining the flow passage 1-1 therein, and the collar 2 is joined via the brazed portion 2-2 to the outer circumference of the end of the pipe of the rail body 1 having the tapered surface 1-2 in the same manner as described above, the collar 2 having the short cylindrical body and including the external thread 2-1 on the outer circumferential surface thereof. The end cap 13 having the cap-nut shape used in this embodiment includes a cross-sectionally rectangular sealing projection 13-1 having a front edge 13-1a on the opposed surface facing the tapered surface 1-2 formed on the opening at the end of the pipe of the rail body 1.

According to the end seal structure of the fuel rail for the gasoline direct injection engine shown in FIG. 2, when the end cap 13 having the cap-nut shape screwed and fixed to the collar 2 is tightened, the front edge 13-1a of the sealing projection 13-1 of the end cap brings into pressure contact with the tapered surface 1-2 of the rail body 1 by the axial force created by the tightening of the end cap 13 having the cap-nut shape and thus the end of the opening of the rail body 1 is sealed. Accordingly, similarly to the end seal structure of the fuel rail for the gasoline direct injection engine shown in FIG. 1, also in the case of this end seal structure of the fuel rail for the gasoline direct injection engine, the brazed portion 2-2 exhibits excellent characteristics in terms of resistance to fatigue failure and has the capability of accommodating itself to a higher internal pressure applied to the flow passage 1-1 of the rail body 1. Also, since the brazed portion 2-2 is constructed and arranged such that it does not contact the fuel in the rail body 1 (pressure medium), it never acts as a factor that leads to breakage due to concentration of stress. Moreover, the stability and reliability of the seal at the end of the rail body 1 are also ensured in this embodiment thanks to the sealing mechanism that the front edge 13-1a of the sealing projection 13-1 of the end cap brings into pressure contact with the tapered surface 1-2 of the rail body 1 by the axial force created by tightening of the end cap 13 having the cap-nut shape and thus the end of the rail body 1 is sealed. Further, this end seal structure also features the mechanism in which the end cap 13 having the cap-nut shape is screwed to the collar 2, so that the rail body 1 does not need to be made thicker.

Figure 3:
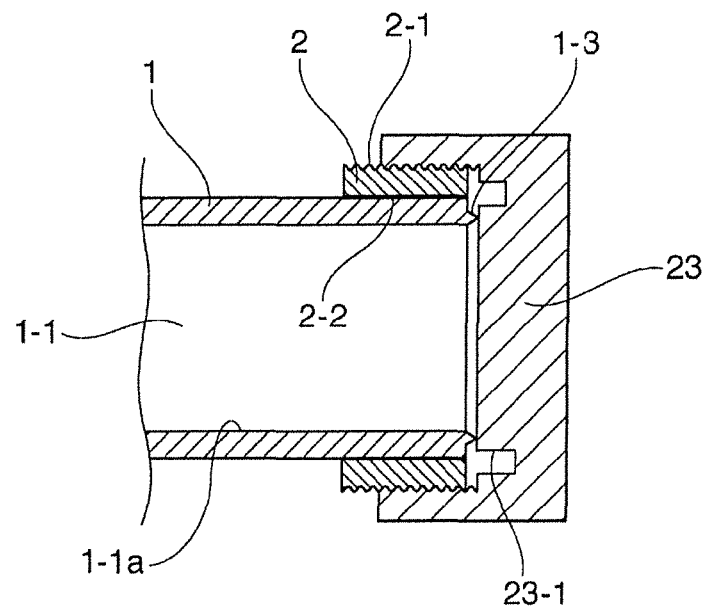
FIG. 3 is a cross-sectional view illustrating an end seal structure in accordance with a third embodiment of the present invention.

An end seal structure of a fuel rail for a gasoline direct injection engine in accordance with a third embodiment shown in FIG. 3 employs a sealing mechanism in which an annular projection is formed on an edge face of an opening at the end of a pipe of a rail body, and the annular projection is brought into pressure contact with an end face of the sealing projection of an end cap having a cap-nut shape and thus the end of the rail body is sealed. More specifically, as illustrated in FIG. 3, the annular projection 1-3 is formed on the edge face of the opening at the end of the pipe of the rail body 1 having a cylindrical inner circumferential wall surface 1-1a defining the flow passage 1-1 therein, and in the same manner as described above, the collar 2 is joined via the brazed portion 2-2 to the outer circumference of the pipe end portion of the rail body 1 having the annular projection 1-3, the collar 2 having a short cylindrical body and including an external thread 2-1 the outer circumferential surface thereof. The cross-sectional structure of the end cap 23 with the shape of the cap nut in this embodiment is substantially identical to the end cap 13 illustrated in FIG. 2, and a cross-sectionally rectangular sealing projection 23-1 is formed on an opposed surface facing the annular projection 1-3 formed on the opening at the end of the pipe of the rail body 1.

According to the end seal structure of a fuel rail for a gasoline direct injection engine shown in FIG. 3, when the end cap 23 having the cap-nut shape screwed and fixed to the collar 2 is tightened, the annular projection 1-3 of the rail body 1 is brought into pressure contact with the sealing projection 23-1 of the end cap by the axial force created by the tightening of end cap 23 with the cap-nut shape and thus the end of the opening of the rail body 1 is sealed. Accordingly, similarly to the end seal structures of the fuel rails for the gasoline direct injection engines illustrated in FIGS. 1 and 2, also in the case of this end seal structure of a fuel rail for a gasoline direct injection engine, the brazed portion 2-2 exhibits excellent characteristics in terms of resistance to fatigue failure and has the capability of accommodating itself to a higher internal pressure applied to the flow passage 1-1 of the rail body 1. Also, since the brazed portion 2-2 is constructed and arranged such that it does not contact the fuel in the rail body 1 (pressure medium), it never acts as a factor that leads to breakage due to concentration of stress. Moreover, the stability and reliability of the seal at the end of the rail body 1 are also ensured in this embodiment thanks to the sealing mechanism that the annular projection 1-3 of the rail body 1 is brought into pressure contact with the sealing projection 23-1 of the end cap by the axial force created by tightening of end cap 23 having the cap-nut shape and thus the end of the rail body 1 is sealed. Further, this end seal structure also features the mechanism in which the end cap 23 having the cap-nut shape is screwed to the collar 2, so that the rail body 1 does not need to be made thicker.

Figure 4:
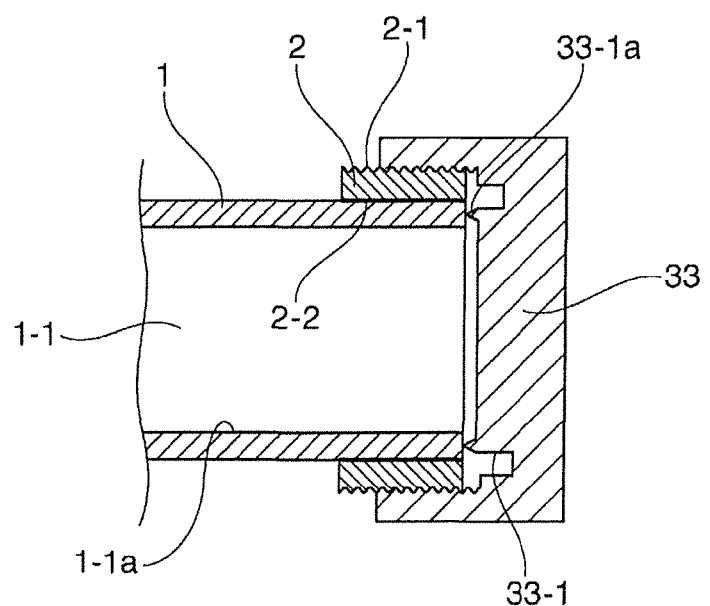
FIG. 4 is a cross-sectional view illustrating an end seal structure in accordance with a fourth embodiment of the present invention.

An end seal structure of a fuel rail for a gasoline direct injection engine in accordance with a fourth embodiment shown in FIG. 4 employs a sealing mechanism in which an annular projection is formed on a sealing projection provided on the an end cap having a cap-nut shape, the annular projection is brought into pressure contact with an edge face of an opening at the end of a pipe of a rail body, and thus the end of the rail body is sealed. More specifically, as illustrated in FIG. 4, the collar 2 is joined via the brazed portion 2-2 to an outer circumference of the pipe end portion of the rail body 1 having the cylindrical inner circumferential wall surface 1-1a defining the flow passage 1-1 therein in the same manner as described above, the collar 2 having a short cylindrical body and including the external thread 2-1 on the outer circumferential surface thereof. The cross-sectional structure of the end cap 33 having the cap-nut shape in this embodiment is substantially identical to the end caps 13 and 23 illustrated in FIGS. 2 and 3, and a cross-sectionally rectangular sealing projection 33-1 is formed on the opposed surface facing the end face of the opening at the end of the pipe of the rail body 1. An annular projection 33-1a is formed on the cross-sectionally rectangular sealing projection 33-1.

According to the end seal structure of the fuel rail for the gasoline direct injection engine shown in FIG. 4, when the end cap 33 having the cap-nut shape screwed and fixed to the collar 2 is tightened, then the annular projection 33-1a formed on the sealing projection 33-1 of the end cap brings into pressure contact with the edge face of the opening at the end of the pipe of the rail body 1 by the axial force created by the tightening of the end cap 33 having the cap-nut shape and thus the end of the opening of the rail body 1 is sealed. Accordingly, similarly to the end seal structures of the fuel rails for the gasoline direct injection engines illustrated in FIGS. 1 to 3, also in the case of this end seal structure of a fuel rail for a gasoline direct injection engine, the brazed portion 2-2 exhibits excellent characteristics in terms of resistance to fatigue failure, and has the capability of accommodating itself to a higher internal pressure applied to the flow passage 1-1 of the rail body 1. Also, since the brazed portion 2-2 is constructed and arranged such that it does not contact the fuel in the rail body 1 (pressure medium), it never acts as a factor that leads to breakage due to concentration of stress. Moreover, the stability and reliability of the seal at the end of the rail body 1 are also ensured in this embodiment thanks to the sealing mechanism that the annular projection 33-1a formed on the sealing projection 33-1 of the end cap brings into pressure contact with the edge face of the opening at the end of the pipe of the rail body 1 by the axial force created by tightening of the end cap 33 having the cap-nut shape and thus the end of the rail body 1 is sealed. Further, this end seal structure also features the mechanism in which the end cap 33 having the cap-nut shape is screwed to the collar 2, so that the rail body 1 does not need to be made thicker.

Figure 5:
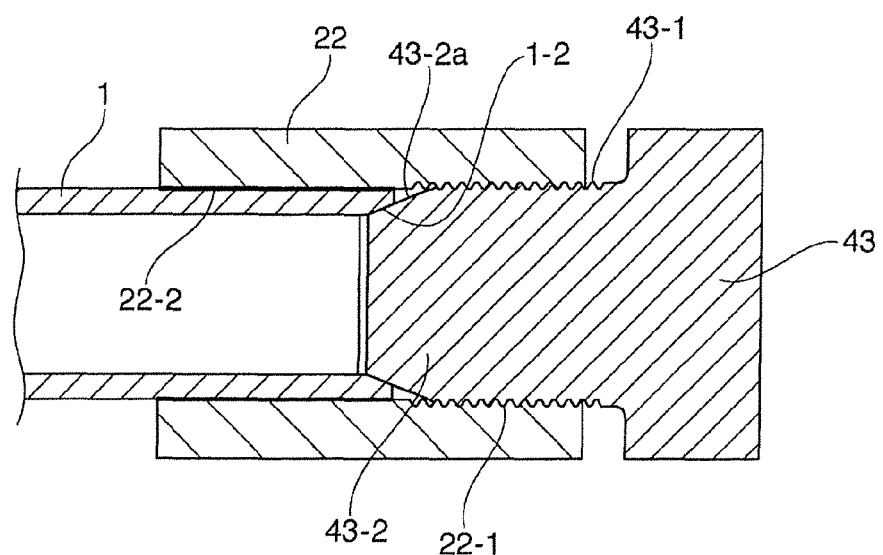
FIG. 5 is a cross-sectional view illustrating an end seal structure in accordance with a fifth embodiment of the present invention.
Figure 6:
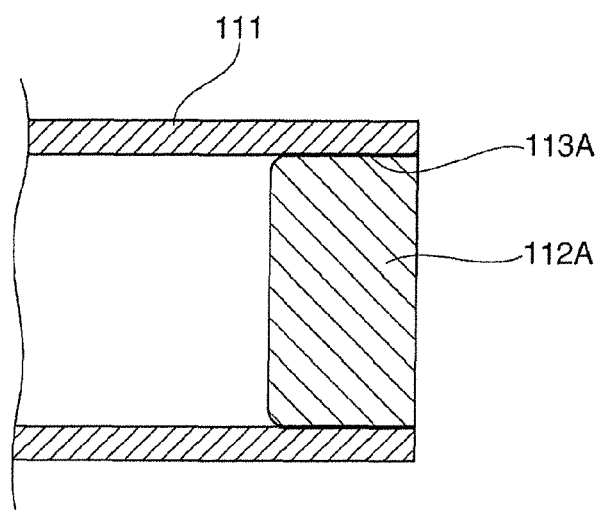
FIG. 6 is a cross-sectional view illustrating an example of a conventional end seal structure of a fuel rail for a gasoline direct injection engine.
Figure 7:
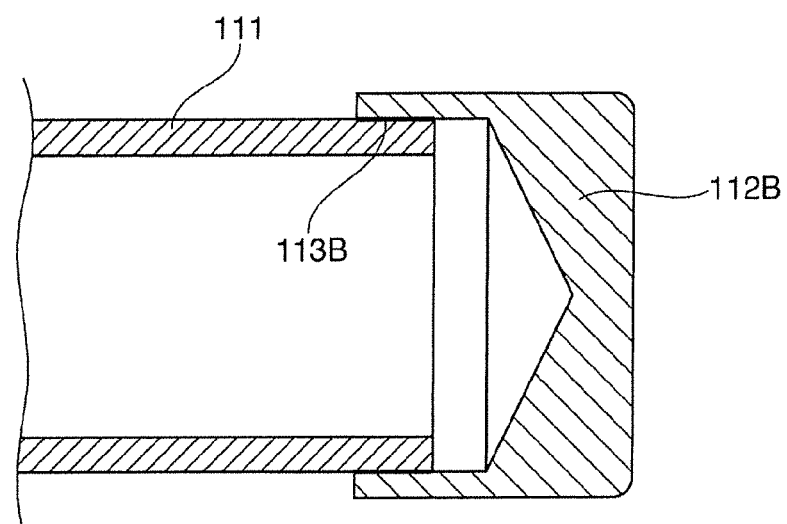
FIG. 7 is a cross-sectional view illustrating another example of a conventional end seal structure of a fuel rail for a gasoline direct injection engine.

Furthermore, an end seal structure of a fuel rail for a gasoline direct injection engine in accordance with a fifth embodiment shown in FIG. 5 employs a screw-tightening mechanism that relies on using an end cap 43 having a bolt shape in place of the screw-tightening mechanism that uses the end cap having the cap-nut shape illustrated in the FIGS. 1 to 4. More specifically, according to this end seal structure, an outer circumferential surface (seat surface) 43-2 of a sealing projection formed at the tip portion of the end cap 43 having the bolt shape brings into pressure contact with the tapered surface 1-2 formed on the inner surface of the opening at the end of the pipe of the rail body 1 with its diameter being increased outward, and thus the end of the rail body 1 is sealed. According to this configuration, the collar 22 is joined by brazing to the outer circumference of the pipe end of the rail body 1, the collar 22 having a short cylindrical body and including an internal thread 22-1 on the inner circumferential surface of an outer end of the collar 22. The end cap 43 having the bolt shape is screwed and fixed to the collar 22, and the outer circumferential surface (seat surface) of the sealing projection 43-2 of the end cap is brought into pressure contact with the tapered surface 1-2 of the opening at the end of the pipe of the rail body 1 by the axial force created by tightening of the end cap 43 having the bolt shape, and thus the end of the rail body 1 is sealed. A 22-2 denotes a brazed portion of the collar 22 and a reference sign 43-1 denotes an external thread in the figure.

As described above, similarly to the end seal structures of the fuel rails for the gasoline direct injection engines shown in FIGS. 1 to 4, also in the case of the end seal structure of the fuel rail for the gasoline direct injection engine shown in FIG. 5, the brazed portion 22-2 exhibits excellent characteristics in terms of resistance to fatigue failure and has the capability of accommodating itself to a higher internal pressure applied to the flow passage 1-1 of the rail body 1. Also, since the brazed portion 22-2 is constructed and arranged such that it does not contact the fuel (pressure medium) in the rail body 1, it never acts as a factor that leads to breakage due to concentration of stress. Moreover, the stability and reliability of the seal at the end of the rail body 1 are also ensured in this embodiment thanks to the sealing mechanism that the outer circumferential surface (seat surface) 43-2a of the sealing projection 43-2 of the end cap is brought into pressure contact with the tapered surface 1-2 of the opening at the end of the pipe of the rail body 1 by the axial force created by tightening of the end cap 43 having the bolt shape, and thus the end of the rail body 1 is sealed.

Further, this end seal structure also features the mechanism in which the end cap 43 having the bolt shape is screwed to the collar 22, so that the rail body 1 does not need to be made thicker.

REFERENCE SIGNS LIST

1 Rail body
1-1 Flow passage
1-1a Inner circumferential wall surface
1-1b End edge on an inner surface
1-2 Tapered surface
1-3, 33-1a Annular projection
2, 22 Collar
2-1 External thread
2-2, 22-2 Brazed portion
3, 13, 23, 33 End cap having a cap-nut shape
3-1, 13-1, 23-1, 33-1, 43-2 Sealing projection
3-1a Tapered surface
13-1a Front edge
22-1 Internal thread
43 End cap having a bolt shape
43-1 External thread
43-2a Outer circumferential surface (seat surface)

The invention claimed is:

1. An end seal structure of a fuel rail for a gasoline direct injection engine, the fuel rail including a rail body composed of a pipe that is closed by an end cap or end caps at an end or both ends of the rail body, the end seal structure being characterized in that:
a collar is joined by brazing to an outer circumference of the end of the pipe of the rail body, the collar having a short cylindrical body and including an external thread formed on an outer circumferential surface of the collar;
the end cap has a cap-nut shape and includes a sealing projection on an surface of the end cap facing an opening at the end of the pipe of the rail body, the sealing projection being placed in abutting contact with an end face of the opening at the end of the pipe, and the end cap is screwed and fixed to the collar; and
the sealing projection of the end cap brings into pressure contact with the end of the opening of the rail body by an axial force created by tightening of the end cap having the cap-nut shape so as to seal the end of the opening of the rail body.

2. The end seal structure of the fuel rail for the gasoline direct injection engine according to claim 1, wherein a sealing mechanism to seal the rail body by the end cap having the cap-nut shape is configured such that the sealing projection of the end cap having the cap-nut shape has a cross-sectionally trapezoidal shape and an area where the sealing projection comes into abutting contact with an end edge on an inner surface of the opening at the end of the pipe of the rail body defines a tapered surface, and the tapered surface of the sealing projection brings into pressure contact with the end edge on the inner surface of the rail body so as to seal the end of the opening of the rail body.

3. The end seal structure of the fuel rail for the gasoline direct injection engine according to claim 1, wherein a sealing mechanism to seal the rail body by the end cap having the cap-nut shape is configured such that an inner surface of the opening at the end of the pipe of the rail body defines a tapered surface whose diameter increases outward, and a front edge of the sealing projection of the end cap having the cap-nut shape brings into pressure contact with the tapered surface so as to seal the end of the opening of the rail body.

4. The end seal structure of the fuel rail for the gasoline direct injection engine according to claim 1, wherein a sealing mechanism to seal the rail body by the end cap having the cap-nut shape is configured such that an annular projection is formed on an edge face of the opening at the end of the pipe of the rail body, and the annular projection is brought into pressure contact with an end face of the sealing projection of the end cap having the cap-nut shape so as to seal the end of the opening of the rail body.

5. The end seal structure of the fuel rail for the gasoline direct injection engine according to claim 1, wherein a sealing mechanism to seal the rail body by the end cap having the cap-nut shape is configured such that an annular projection is formed on the sealing projection of the end cap having the cap-nut shape, and the annular projection brings into pressure contact with an edge face of the opening at the end of the pipe of the rail body so as to seal the end of the opening of the rail body.

6. An end seal structure of a fuel rail for a gasoline direct injection engine, the fuel rail comprising:
a rail body composed of a pipe that is closed by an end cap or end caps at an end or both ends of the rail body;
a collar having an internal-unthreaded inner circumferential surface joined by brazing to a cylindrical outer circumference of the end of the pipe of the rail body, and an internal-threaded inner circumferential surface adjacent the internal-unthreaded inner circumferential surface and projecting from the end of the pipe of the rail body; and
an end cap having a bolt shape and including a sealing projection on a surface of the end cap facing an opening at the end of the pipe of the rail body, the sealing projection being placed in abutting contact with an end of the opening at the end of the pipe, and the end cap being screwed and fixed to the internal-threaded inner circumferential surface of the collar; wherein
the sealing projection of the end cap is brought into pressure contact with the end of the opening of the rail body by an axial force created by tightening of the end cap having the bolt shape so as to seal the end of the opening of the rail body.

7. The end seal structure of the fuel rail for the gasoline direct injection engine according to claim 6, wherein a sealing mechanism to seal the rail body by the end cap having the bolt shape is configured such that an inner surface of the opening at the end of the pipe of the rail body defines a tapered surface whose diameter increases outward, and a tip portion of the sealing projection of the end cap having the bolt shape brings into pressure contact with the tapered surface so as to seal the end of the opening of the rail body.

* * * * *